(12) United States Patent
Cheng

(10) Patent No.: US 6,454,064 B1
(45) Date of Patent: Sep. 24, 2002

(54) WORKSTATION CONTAINER

(76) Inventor: Chun Lung Cheng, 1786 Curtis Ct., La Verne, CA (US) 91750

(*) Notice: Subject to any disclaimer, the term of this patent is extended or adjusted under 35 U.S.C. 154(b) by 0 days.

(21) Appl. No.: 09/861,057

(22) Filed: May 17, 2001

(51) Int. Cl.[7] .................................................. A45F 3/00
(52) U.S. Cl. ............................. 190/11; 190/3; 190/11; 190/18 A; 190/35
(58) Field of Search ................................ 190/1, 2, 3, 4, 190/5, 6, 7, 8, 9, 10, 11, 12 R, 12 A, 33, 115, 18 A; 312/241, 240, 902; 248/463–465

(56) References Cited

U.S. PATENT DOCUMENTS

| | | | | |
|---|---|---|---|---|
| 96,236 A | * | 10/1869 | Hunt | 190/5 |
| 437,716 A | * | 10/1890 | Owens | 190/4 |
| 568,927 A | * | 10/1896 | Starr | 190/5 |
| 957,704 A | * | 5/1910 | McCarthy | 190/7 |
| 1,022,158 A | * | 4/1912 | Simonsen | 190/11 |
| 2,453,129 A | * | 11/1948 | Hinton | 190/12 R X |
| 2,628,659 A | * | 2/1953 | Carpenter | 190/8 |
| 3,711,984 A | * | 1/1973 | Dyer et al. | 190/11 X |
| 4,195,889 A | * | 4/1980 | Coyne | 190/12 R |
| 4,564,091 A | * | 1/1986 | Coneglio | 190/11 |
| 4,702,029 A | * | 10/1987 | DeVaul et al. | 42/94 |
| 4,966,258 A | * | 10/1990 | Hawley | 190/4 |
| 5,876,048 A | * | 3/1999 | Lee | 190/115 X |

* cited by examiner

*Primary Examiner*—Lee Young
*Assistant Examiner*—Tri M. Mai
(74) *Attorney, Agent, or Firm*—Raymond Y. Chan; David and Raymond Patent Group

(57) ABSTRACT

A workstation container includes a container body having a front panel and a back panel wherein a receiving cavity is defined between the front and back panels for storing a computer therein, a container cover having a back portion pivotally connected to the back panel edge to edge for enclosing the receiving cavity, and a folding table pivotally connected to the front panel wherein the folding table includes at least a side work table slidably extended from a side of the folding table. The folding table is adapted for pivotally folding from a closed position to an opened position wherein in the closed position, the folding table is unfolded to enclose the receiving cavity, and in the opened position, the folding table is outwardly folded in a horizontal position with respect to the front panel for rigidly supporting the computer on the folding table.

9 Claims, 7 Drawing Sheets

WORKSTATION CONTAINER

BACKGROUND OF THE PRESENT INVENTION

1. Field of Invention

The present invention relates to a workstation, and more particularly to a workstation container which can both be used for carrying and storing a computer and supporting the computer as a workstation.

2. Description of Related Arts

Nowadays, computers are showing a tendency to decrease their size and weight such as a laptop or a notebook such that people can carry such compact computer anywhere. For convenience, a user usually purchases a fabric made computer bag having relative lightweight for easy carriage and storage. However, the fabric made computer bag may not protect the expensive laptop due to an unwanted collision. Also, while using the laptop, the user may merely put the computer bag somewhere which is a waste of working space and the computer bag may easily to be stolen or lost. In other words, the computer bag for the laptop can only be purposely used for carriage and storage.

For most outdoor workers, such as moviemakers, civil engineers, constructers, and etc., they also demand on the computers very much so that they must carry the computer and work outdoor wherever they go. However, most of their working environments are wild and not like an office or a coffee shop On the other hand, due to the compact size of the laptop, the built-in keyboard and mouse must be reduced the size thereof to fit into the laptop. So, the user may easily to get tired while operating the laptop for a period of time due to the improper typing position. For long time usage, the compact size of the keyboard and mouse may cause a serious injury to the user's hands. However, it is also unreasonable for the user to carry an extra keyboard and mouse that the user must carry an extra bag for storage and carriage. In fact, a portable desktop becomes an extravagant hope for most users.

SUMMARY OF THE PRESENT INVENTION

A main object of the present invention is to provide a workstation container, which can be quickly and easily closed up for carrying and storing a computer and unfolded for supporting the computer as a workstation.

Another object of the present invention is to provide a workstation container that can well protect a computer while traveling so as to prevent the computer from being collided accidentally.

Another object of the present invention is to provide a workstation container which not only provides adequate support for a computer but also provides additional worktables for supporting computer accessories such as an auxiliary keyboard, mouse, and external terminals.

Another object of the present invention is to provide a workstation container that can be used in any location and transported in any vehicle without using tools for its assembly or disassembly.

Accordingly, in order to accomplish the above objects, the present invention provides a workstation container, which comprises:

a container body having a front panel and a back panel wherein a receiving cavity is defined between the front and back panels for storing a computer in the receiving cavity;

a container cover having a back portion pivotally connected to the back panel of the container body edge to edge for covering the receiving cavity of the container body; and a folding table pivotally connected to the front panel of the container body wherein the folding table comprises at least a side work table outwardly extended from a side of the folding table in a slidably movable manner;

wherein the folding table is capable of pivotally folding from a closed position to an opened position, wherein in the closed position, the folding table is unfolded to enclose the receiving cavity, and in the opened position, the folding table is outwardly folded in a horizontal position with respect to the front panel of the container body adapted for rigidly supporting the computer on the folding table.

DETAILED DESCRIPTION OF THE PREFERRED EMBODIMENT

Figure 1:
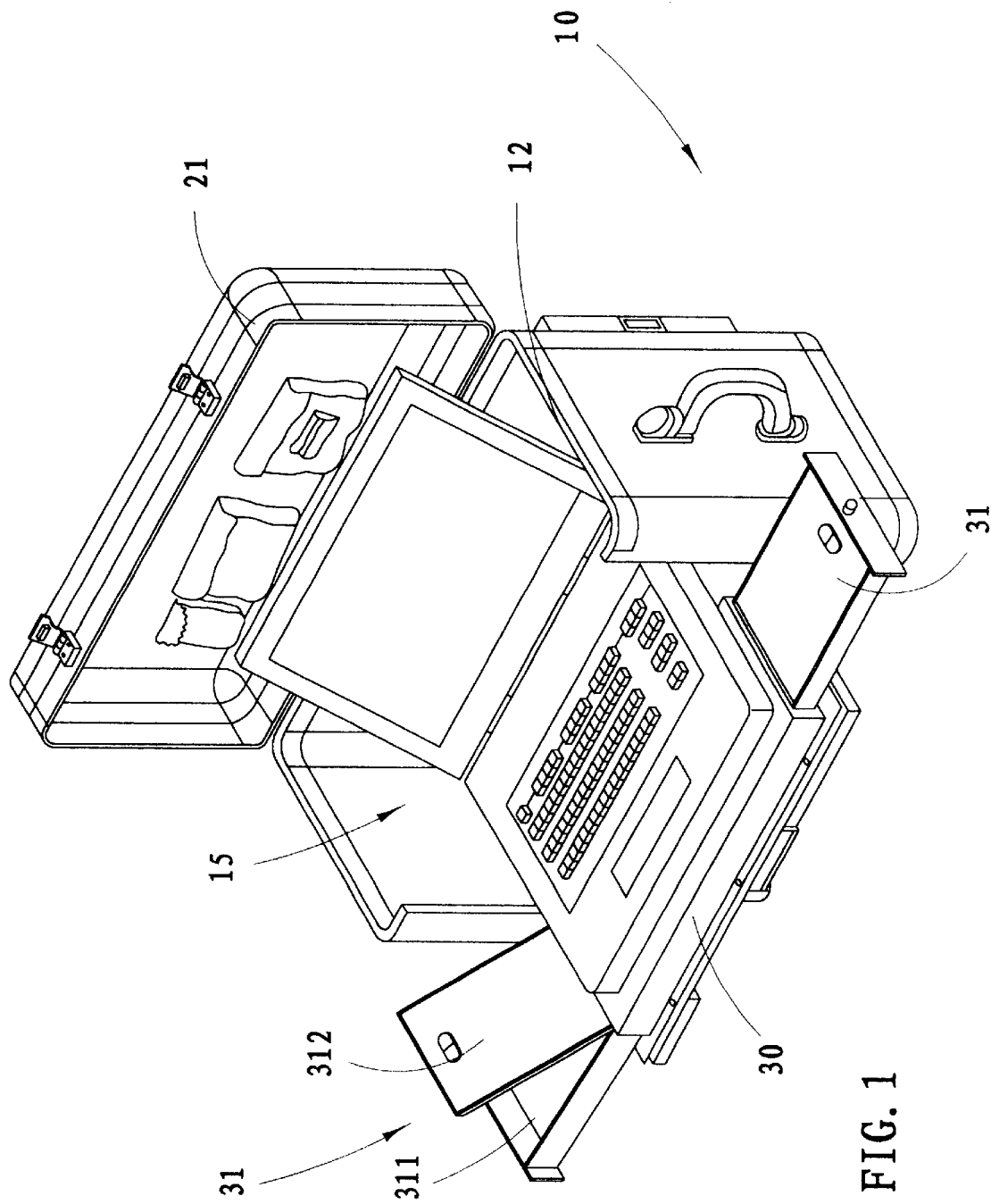
FIG. 1 is a perspective view of a workstation container according to a first preferred embodiment of the present invention, illustrating a computer being supported thereon.

Referring to FIG. 1 of the drawings, a workstation container according to a preferred embodiment of the present invention is illustrated, wherein the workstation container can be quickly and easily closed up for storing and carrying a computer such as a laptop computer or a notebook computer and unfolded for supporting the computer as a workstation.

Figure 2:
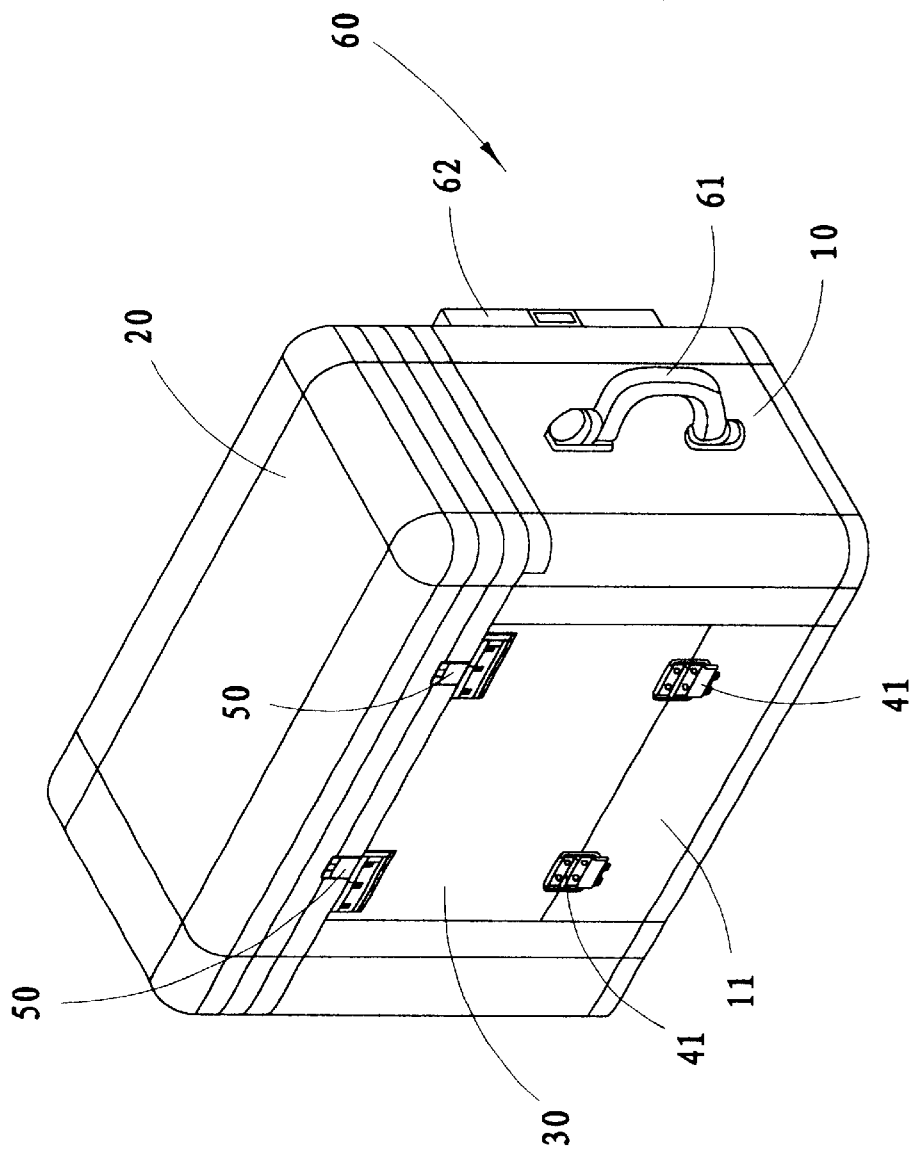
FIG. 2 is a perspective view of the workstation container in a closed position according to the above first preferred embodiment of the present invention.
Figure 3:
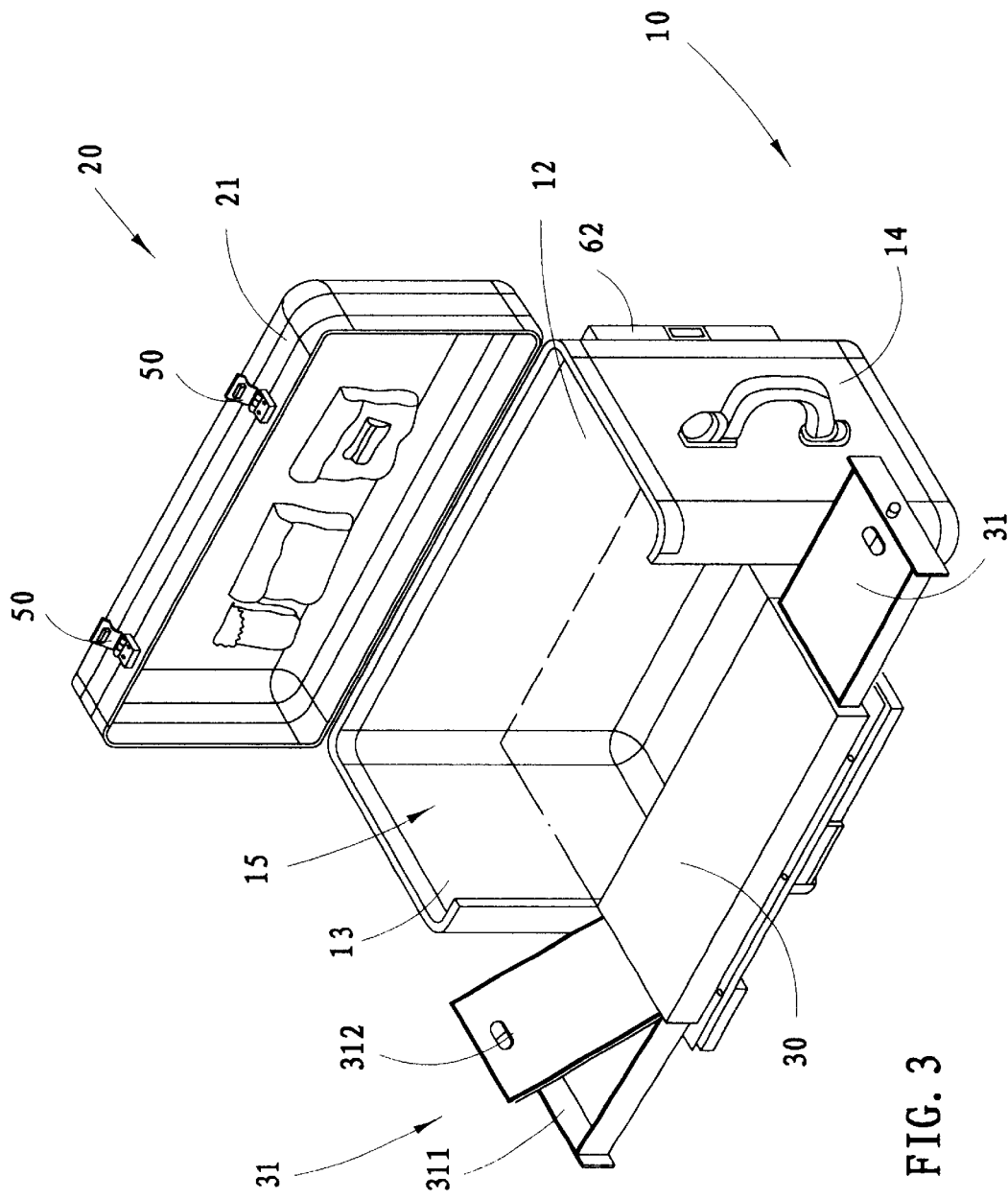
FIG. 3 is a perspective view of the workstation container in an opened position according to the above first preferred embodiment of the present invention.

As shown in FIGS. 2 and 3, the workstation container comprises a container body 10 having a front panel 11, a back panel 12, and two side panels 13, 14, wherein a receiving cavity 15 is defined therebetween for storing the computer within the receiving cavity 15. The container body 10 also comprises a container cover 20 having a front portion 21 and a back portion 22, wherein the back portion 22 is pivotally connected to the back panel 12 of the container body 10 in an edge to edge manner, adapted for enclosing the receiving cavity 15 of the container body 10.

Accordingly, the workstation container is made of durable but lightweight material such as Aluminum or Titanium so that the computer can be well protected by the workstation container so as to prevent the computer from being collided accidentally.

The workstation container essentially comprises a folding table 30 which is pivotally connected to the front panel 11 of the container body 10 in a edge to edge manner, wherein the folding table 30 comprises at least a side work table 31 slidably extended from a side of the folding table 30 in a slidably movable manner.

Accordingly, a top edge of the front panel 11 is pivotally connected to a bottom edge of the folding table 30 such that the folding table 30 is adapted for outwardly folding with respect to the front panel 11 wherein the back panel 12 having a height equal to a total height of the front panel 11 and the folding table 30.

The folding table 30 is constructed to be capable of pivotally folding from a closed position to an opened position. In the closed position, as shown in FIG. 2, the folding table 30 is folded up to a vertical position to enclose the receiving cavity 15, and in the opened position, as shown in FIG. 3, the folding table 30 is outwardly folded down in a horizontal position with respect to the front panel 11 of the container body 10 for rigidly supporting the computer on the folding table 30.

According to the preferred embodiment, the folding table 30 which is a hollow case panel further comprises two side work tables 31 received within the folding table 30 through two sides of the folding table 30, so that the two side tables 31 can be slidably extended from two sides of the folding table 30 respectively, as shown in FIGS. 1 and 3. Each of the two side tables 31 comprises a side drawer 311 and a cover flap 312 pivotally covered up the side drawer 311. In other words, computer accessories such as diskettes can be placed in the side drawers 311 so as to create more working spaces for the workstation.

Figure 4:
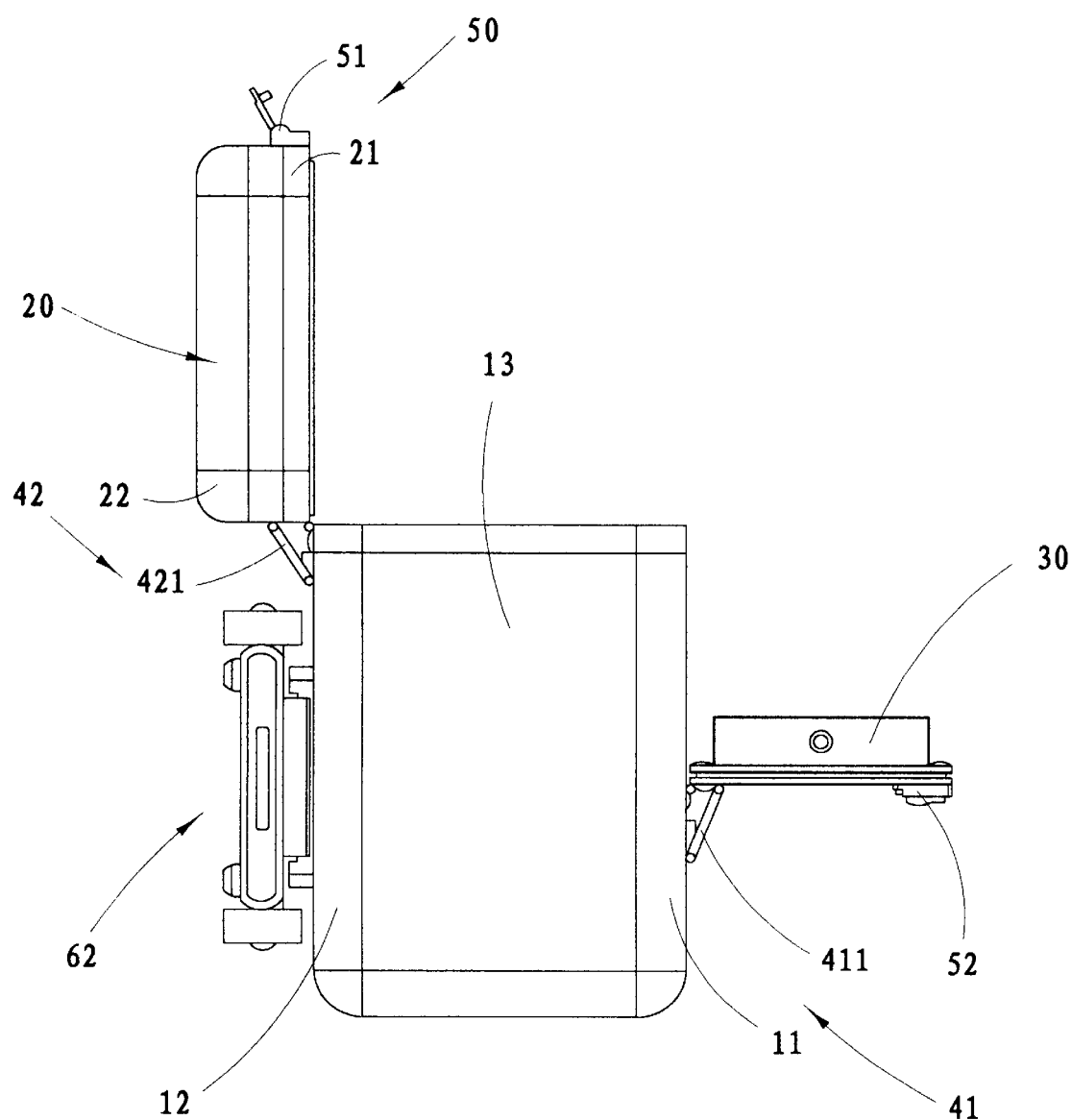
FIG. 4 is a side view of the workstation container according to the above first preferred embodiment of the present invention.

The workstation container further comprises at least a first pivot hinge 41 pivotally connecting the folding table 30 to the front panel 11 of the container body 10 and at least a second pivot hinge 42 pivotally connecting the back portion 22 of the container cover 20 to the back panel 12 of the container body 10, as shown in FIG. 4.

The first pivot hinge 41 comprises a first movable supporting frame 411 having two ends biasing against the front panel 11 of the container body 10 and the folding table 30 respectively when the folding table 30 is in the unfolded position in such a manner that the first movable supporting frame 411 is adapted for rigidly supporting the folding table 30 in the horizontal position.

The second pivot hinge 42 comprises a second movable supporting frame 421 having two ends biasing against the back panel 12 of the container body 10 and the back portion 21 of the container cover 20 respectively in such a manner that the second movable supporting frame 421 is adapted for rigidly supporting the container cover 20 in an upright manner when unfolding the container cover 20.

Accordingly, when the folding table 30 is unfolded to the horizontal-open condition, as shown in FIGS. 1, 3 and 4, the user may simply take out the notebook computer and put on the folding table 30 to start working. Other computer assocaries, such as portable scanner, portable printer, web camera, and etc., can be carried in the receiving cavity 15 and are ready to use any time with the notebook computer. When using the notebook computer on the folding table 30, the top surface of the side work table 31 becomes a mouse surface for the mouse to work on too. Additional drive such as CD drive, DVD drive and external floppy disc drive can be extended to rest on the other side work table 31 to work with the notebook computer.

The workstation container further comprises a locker means 50 for locking the container cover 20 with container body 10, a carrying means 60 for transporting the workstation container, and an attaching means 70 for supporting the workstation container on a floor standing frame 3.

The locker means 50 comprises at least a first locking member 51 affixed to the front portion 21 of the container cover 20 and at least a second locking member 52 affixed to the folding table 30 wherein the first locking member 51 is adapted for securely engaging with the second locking member 52 so as to lock up the container cover 20 with the container body 10.

Figure 5:
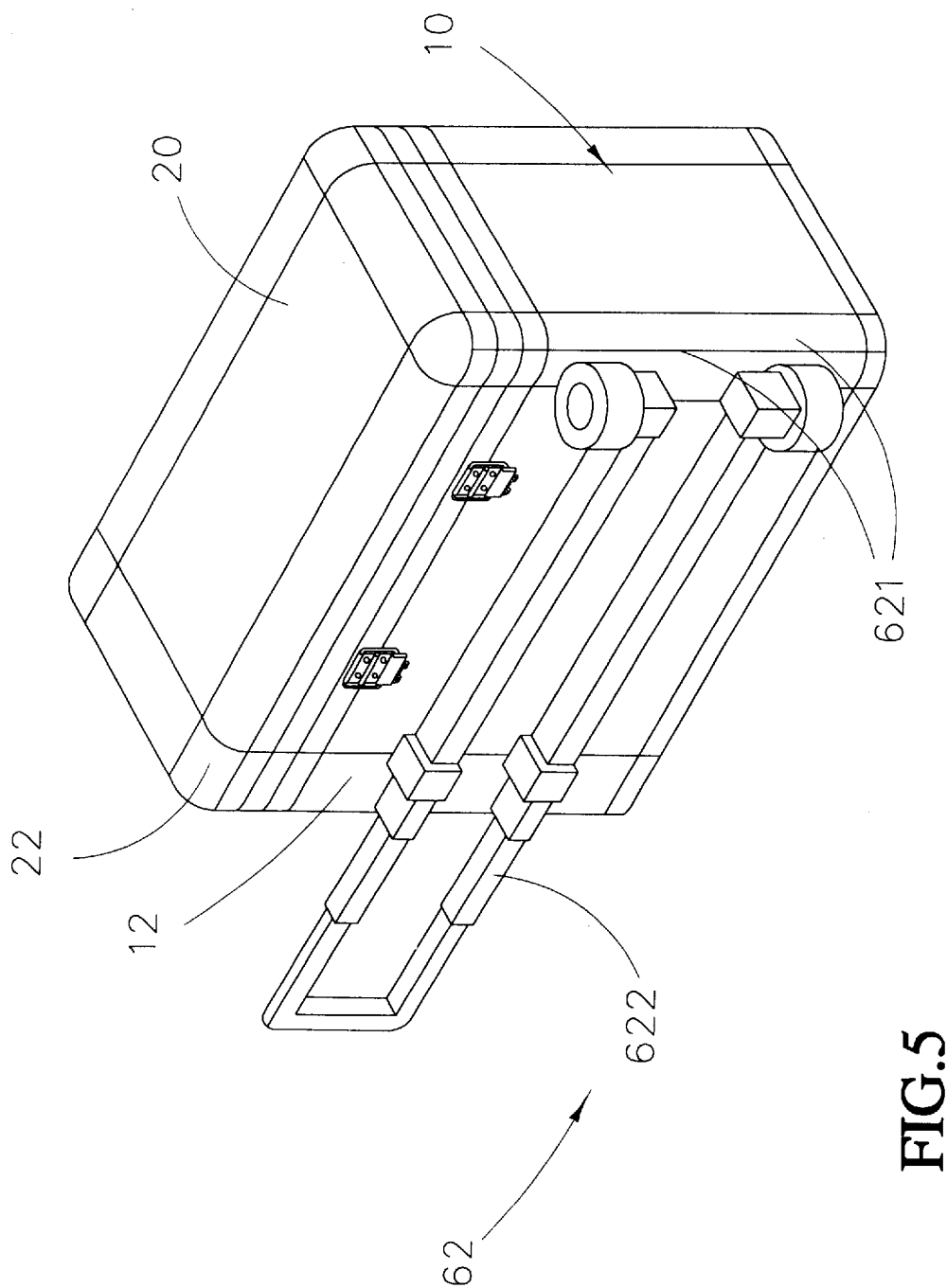
FIG. 5 is a rear perspective view of the workstation container according to the above first preferred embodiment of the present invention.

As shown in FIG. 5, the carrying means 60 comprises a U-shaped hand bar 61 mounted on one of the side panels 13 of the container cover 20 and a carrying frame 62 transversely affixed to the back panel 12 of the container body 10, wherein the carrying frame 62 comprises a pair of wheels 621 rotatably mounted on one side end thereof and a retractable pull handle 622 mounted to an opposed side end of the carrying frame 62 in such a manner that a user is able to carry the workstation container by pulling the retractable pull handle 622.

Figure 6:
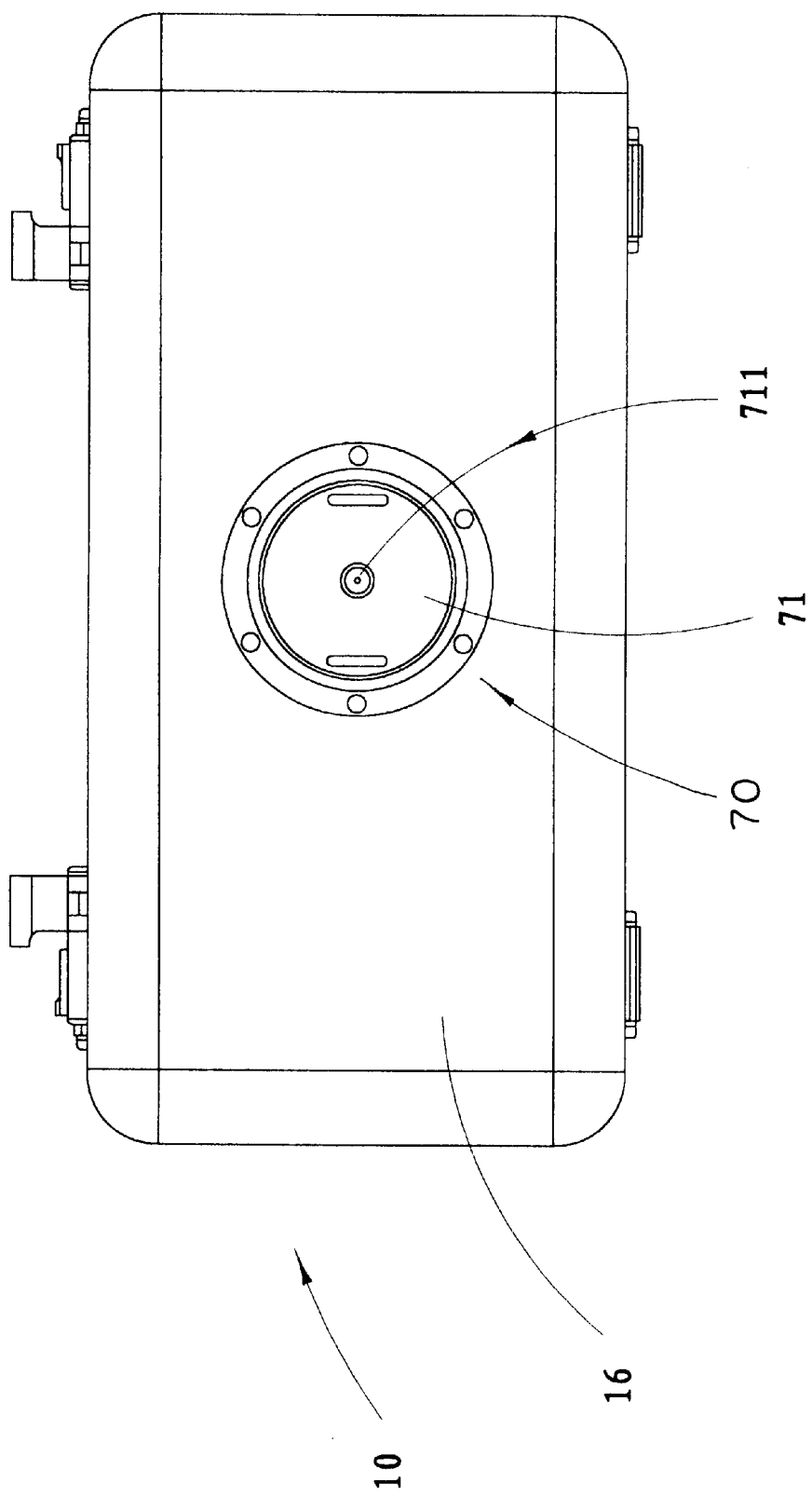
FIG. 6 is a bottom view of the workstation container according to the above first preferred embodiment of the present invention.

As shown in FIG. 6, the attaching means 70 comprises a mounting panel 71 having a threaded socket 711 mounted on a bottom panel 16 of the container body 10, wherein the floor standing frame is adapted for connecting to the mounting panel 71 so as to rigidly support the workstation container. Accordingly, the floor standing frame can be an existing tripod having a connecting head screwing into the threaded socket 711 of the mounting panel 71 in order to connect the workstation container with the tripod.

Figure 7:
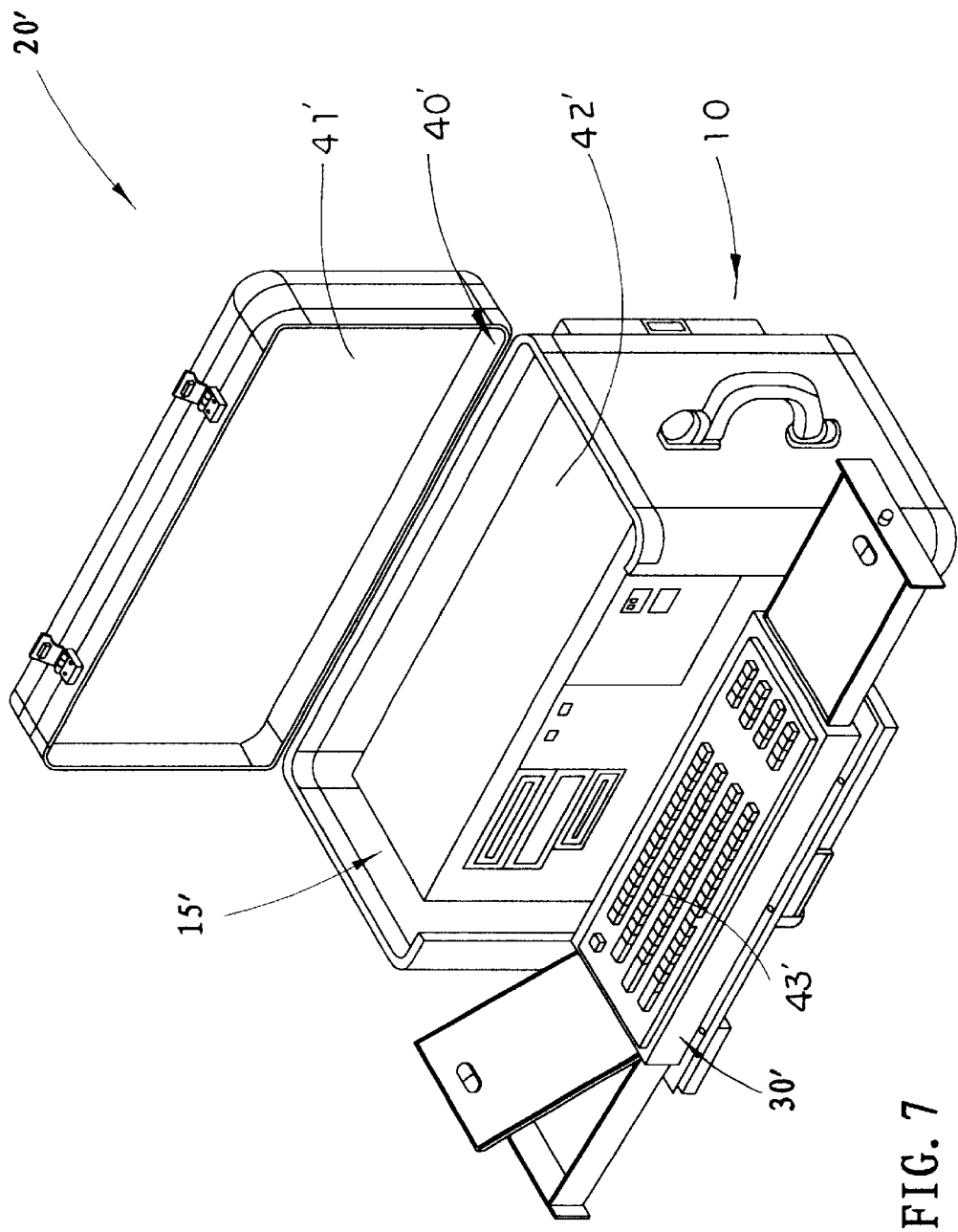
FIG. 7 is a perspective view of a workstation container according to a second preferred embodiment of the present invention.

It is well known that a computer comprises a monitor, a plurality of computer's components such as hard disk and motherboard, a control panel such as keyboard and mouse. It is worth to mention that the workstation container is capably of forming a casing of a computer system 40', as shown in FIG. 7, wherein a LCD monitor 41' is mounted on an interior of the container cover 20', other computer components such as the CPU 42' can be installed in the receiving cavity 15' and the keyboard 43' can be mounted on the folding table 30' in such a manner that the workstation container becomes a portable desktop computer 40' for a user such as moviemakers, civil engineers, constructers, and etc. can carry the well protected desktop-type computer and work outdoor wherever they go the who need a heavy duty computer.

What is claimed is:

1. workstation container, comprising:

a container body having a back panel and a front panel which is shorter than said back panel, wherein a receiving cavity is defined between said front and back panels for storing a computer in said receiving cavity;

a container cover having a back portion pivotally connected to said back panel of said container body in an edge to edge manner for fittedly enclosing said receiving cavity of said container body;

a folding table pivotally connected to said front panel of said container body, wherein said folding table comprises at least a side work table outwardly extended from a side of said folding table in a slidably movable manner, wherein said folding table is adapted for pivotally folding from a closed position to an opened position, wherein in said closed position, said folding table is unfolded to enclose said receiving cavity, and in said opened position, said folding table is outwardly folded in a horizontal position with respect to said front panel of said container body for rigidly supporting said computer on said folding table; and at least a first pivot hinge pivotally connecting said folding table to said front panel of said container body wherein said first pivot hinge comprises a first movable supporting frame having two ends biasing against said front panel of said container body and said folding table respectively when said folding table is in said unfolded position.

2. A workstation container, comprising:

a container body having a back panel and a front panel which is shorter than said back panel, wherein a receiving cavity is defined between said front and back panels for storing a computer in said receiving cavity;

a container cover having a back portion pivotally connected to said back panel of said container body in an edge to edge manner for fittedly enclosing said receiving cavity of said container body;

a folding table pivotally connected to said front panel of said container body, wherein said folding table comprises at least a side work table outwardly extended from a side of said folding table in a slidably movable manner, wherein said folding table is adapted for pivotally folding from a closed position to an opened position, wherein in said closed position, said folding table is unfolded to enclose said receiving cavity, and in said opened position, said folding table is outwardly folded in a horizontal position with respect to said front panel of said container body for rigidly supporting said computer on said folding table, wherein said side table comprises a side drawer slidably received in said folding table and a cover flap for pivotally covering up said side drawer, wherein said folding table which is a hollow case to receive said side work table therein when said folding table is in said closed position, wherein said folding table is capable of sliding out from said folding table to extend aside when said folding table is in said opened position, wherein a top surface of said cover flap is adapted to be functions as a mouse surface; and at least a first pivot hinge pivotally connecting said folding table to said front panel of said container body wherein said first pivot hinge comprises a first movable supporting frame having two ends biasing against said front panel of said container body and said folding table respectively when said folding table is in said unfolded position.

3. A workstation container, comprising:

a container body having a back panel and a front panel which is shorter than said back panel, wherein a receiving cavity is defined between said front and back panels for storing a computer in said receiving cavity;

a container cover having a back portion pivotally connected to said back panel of said container body in an edge to edge manner for fittedly enclosing said receiving cavity of said container body;

a folding table pivotally connected to said front panel of said container body, wherein said folding table comprises at least a side work table outwardly extended from a side of said folding table in a slidably movable manner, wherein said folding table is adapted for pivotally folding from a closed position to an opened position, wherein in said closed position, said folding table is unfolded to enclose said receiving cavity, and in said opened position, said folding table is outwardly folded in a horizontal position with respect to said front panel of said container body for rigidly supporting said computer on said folding table, wherein said side table comprises a side drawer slidably received in said folding table and a cover flap for pivotally covering up said side drawer, wherein said folding table which is a hollow case to receive said side work table therein when said folding table is in said closed position, wherein said folding table is capable of sliding out from said folding table to extend aside when said folding table is in said opened position, wherein a top surface of said cover flap is adapted to be functions as a mouse surface;

a carrying frame transversely affixed to said back panel of said container body wherein said carrying frame comprises a pair of wheels rotatably mounted on one side end thereof and an retractable pull handle slidably mounted to an opposed side end of said carrying frame; and at least a first pivot hinge pivotally connecting said folding table to said front panel of said container body wherein said first pivot hinge comprises a first movable supporting frame having two ends biasing against said front panel of said container body and said folding table respectively when said folding table is in said unfolded position.

4. A workstation container, as recited in claim 3, further comprising an attaching means which comprises a mounting panel having a threaded socket mounted on a bottom panel of said container body.

5. A workstation container, as recited in claim 4, wherein said folding table has a height equal to a height difference between said back panel and said front panel.

6. A workstation container, as recited in claim 5, further comprises a locker means for locking said container cover with said container body wherein said locker means comprises at least a first locking member affixed to a front portion of said container cover and at least a second locking member affixed to said folding table wherein said first locking member is adapted for securely engaging with said second locking member so as to lock up said container cover with said container body.

7. A workstation container, as recited in claim 4, further comprising a locker means for locking said container cover with said container body wherein said locker means comprises at least a first locking member affixed to a front portion of said container cover and at least a second locking member affixed to said folding table wherein said first locking member is adapted for securely engaging with said second locking member so as to lock up said container cover with said container body.

8. A workstation container, as recited in claim 3, wherein said folding table has a height equal to a height difference between said back panel and said front panel.

9. A workstation container, as recited in claim 3, further comprising a locker means for locking said container cover with said container body wherein said locker means comprises at least a first locking member affixed to a front portion of said container cover and at least a second locking member affixed to said folding table wherein said first locking member is adapted for securely engaging with said second locking member so as to lock up said container cover with said container body.

* * * * *